Nov. 21, 1933.  H. DONANDT  1,935,975
SAFETY APPLIANCE FOR ROTARY WINDING MEMBERS OF HAULING MACHINES
Filed Oct. 10, 1932
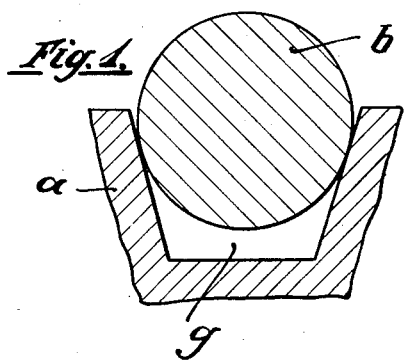
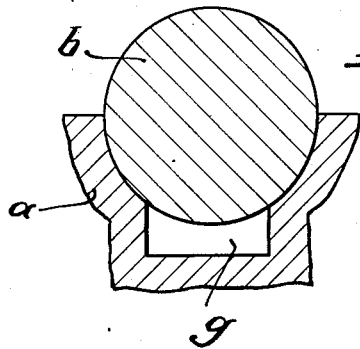
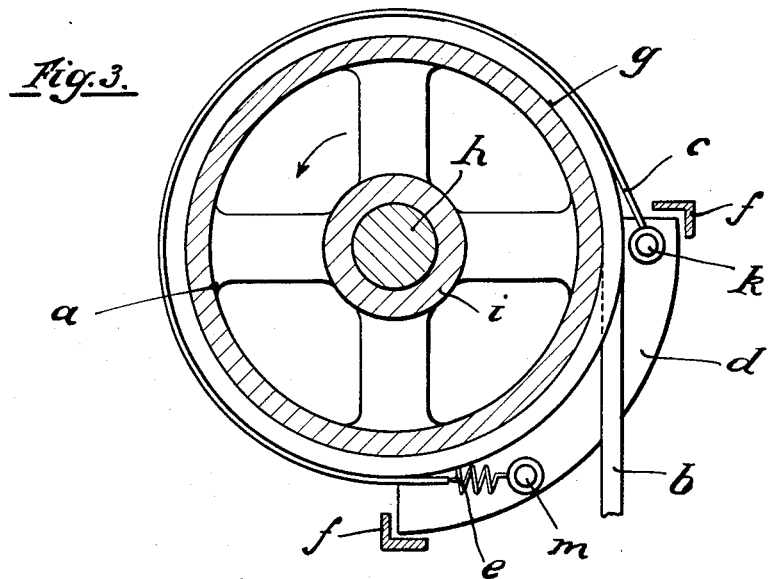
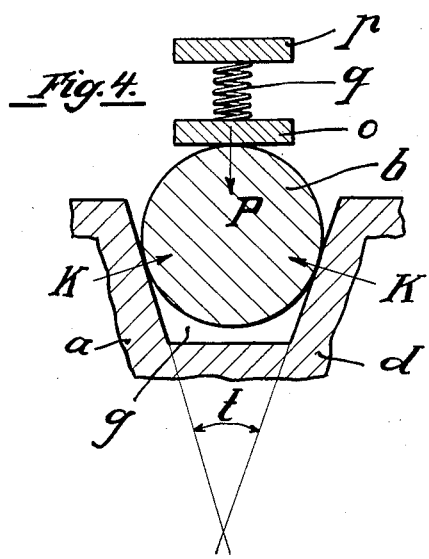
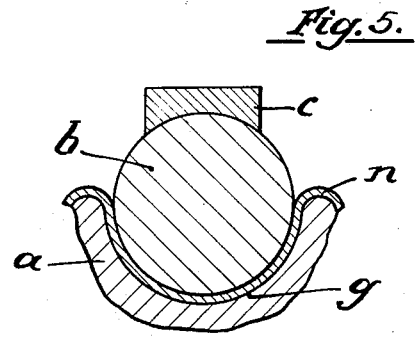
Inventor:
Hermann Donandt
by Karl Michaelis
Atty.

Patented Nov. 21, 1933

1,935,975

UNITED STATES PATENT OFFICE 1,935,975

SAFETY APPLIANCE FOR ROTARY WINDING MEMBERS OF HAULING MACHINES

Hermann Donandt, Berlin-Wilmersdorf, Germany

Application October 10, 1932, Serial No. 637,163, and in Germany October 17, 1931

7 Claims. (Cl. 242—117)

My invention relates to safety appliances for rotary winding members of hauling machines, for instance for sheaves, pulleys, hauling drums and the like, whose object is to prevent jumping or creeping of the tension member, for instance, a cable, from or on the winding member when the load on the cable is abruptly relieved, for instance, upon the setting-up of the cage in a hauling engine, or of the hook fittings in a crane. Jumping of the cable may result in the formation of loops and in interference of the windings of the cable on the sheave, and the windings may get entangled to such an extent that the cable is damaged or even broken upon the restarting of the machine. It has been attempted to prevent the formation of loops by providing a presser cylinder for applying the cable to the sheave at the point where the cable runs off. The presser cylinder generates friction between the cable and the sheave and this friction prevents jumping of the cable after the load on the cable has been relieved. It has been found, however, that presser cylinders, instead of preventing the formation of loops, may even cause it. When the cable runs off the sheave, it entrains the presser cylinder against the frictional resistance of its bearings, i. e. the cable is retained by the presser cylinder against the direction in which it is unwound, so that it tends to lag with respect to the sheave and the frictional resistance of the bearings, particularly if they are badly maintained, may cause creeping and lagging of the cable which may lead to jumping and the formation of loops.

It is an object of my invention to provide a safety appliance by which creeping, lagging and jumping of the cable are absolutely prevented. To this end I provide pressure-exerting means for applying the tension member or cable to the winding member or sheave etc., and I so design the winding member that the friction between the winding member and the tension member is higher than the friction between the tension member and the pressure-exerting means.

The higher friction between the sheave and the cable may be produced in various ways. For instance, the sheave may be made with grooves of particular sections, as will be described, or the sheave, or its groove, may be provided with a friction-increasing lining or coating, such as a metal, a layer of lacquer or other paint, or friction-increasing parts may be inserted between the sheave and the cable.

As the pressure-exerting means, I prefer a member, such as a brake block or a brake band, which has a comparatively large area in contact with the cable, and not line contact, such as the presser cylinder referred to, because the pressure per unit of area between the cable and the pressure-exerting means is reduced by the larger area of the means. Notwithstanding the large area of such pressure-exerting means, the friction between the sheave and the cable is increased to such an extent by the means aforesaid that the cable, on being unwound, is positively entrained by the sheave and not retained by the block or band, as the friction exerted on the cable by the block or band is so much less than the friction at the sheave. In this manner, creeping, lagging and jumping of the cable and the formation of loops are absolutely prevented.

In the case of a brake band, it has been found that creeping or jumping of the cable under its resilient reaction, for instance at the end of a long downward journey in a hauling engine, may still occur but that even this can be prevented by a suitable arrangement of the brake band. It is another object of my invention to provide such a suitable arrangement. To this end I so arrange a brake band having tensioning means such as a spring, that, when the cable is wound the force exerted on the band by the friction of the cable acts in the same direction as the force exerted by the spring. By these means, the cable is strongly applied to the sheave, or forced into its groove by the brake band when being wound. When the cable is unwound, the direction of the force exerted on the band by the friction of the cable is reversed, i. e., it acts in opposite direction to the action of the spring, relieving the tension of the brake band and permitting the cable to run off against a reduced resistance so that it has no tendency to creep, lag, or jump.

In the drawing affixed to this specification and forming part thereof, various sections of grooves, friction-increasing means and a hauling drum embodying my invention, are illustrated diagrammatically by way of example.

In the drawing

Figs. 1 and 2 are two sections of grooves in a sheave or drum by which the friction between the sheave and the cable is increased, Fig. 3 is a transverse section of a hauling drum equipped with a brake band which is arranged according to my invention, Fig. 4 is a section showing a cable in a groove as illustrated in Fig. 1, with the forces and reactions acting on the cable and the groove, and Fig. 5 is a section of a semicircular groove with a friction-increasing layer on the sheave.

Referring now to the drawing, $a$ is the sheave which is shown as a hauling drum in Fig. 3, and $g$ is its groove which in the hauling drum is helical. The sections of grooves $g$ illustrated in Figs. 1 and 2, i. e. a trapeze and a rectangle with curved seats for the cable at both sides, respectively, are old in the art and in the present instance are provided for increasing the friction between the winding member $a$ and the tension member $b$ which may be a cable or a rope.

Referring now particularly to Fig. 3, the hauling drum $a$ is keyed on a driving shaft $h$ with its boss $i$ and equipped with a helical groove $g$ for the reception of the cable $b$. $c$ is the pressure-exerting means, here shown as a brake band. $d$ is a sector which moves axially along the drum for guiding the cable and is old in the art. $f, f$ are checks, here shown as angle sections, for preventing rotation of the sector with the drum. $k$ and $m$ are pins by which the ends of the brake band $c$ are attached to the sector $d$ and $e$ is a spring which is inserted between one end of the brake band and the corresponding pin $m$. Obviously any other suitable means for imparting tension to the brake band $c$ may be provided.

Fig. 3 also illustrates the favorable arrangement of the brake band referred to, by which creeping, lagging, jumping and the formation of loops are absolutely prevented. The pin $k$ to which one end of the brake band $c$ is positively connected, is arranged near the point where the cable $b$ runs on or off the drum $a$. When the drum is rotated in the direction of the arrow, the cable $b$ is wound and the force exerted on the band $c$ by the friction of the cable as it moves with the drum, acts in the same direction as the pull of the spring $e$. When the drum is reversed for rotation against the arrow, the force exerted by the friction of the cable acts in the same direction as the pull of the spring $e$ and the resistance against the running-off of the cable $b$ is reduced in proportion.

The groove in the drum may be sectioned as illustrated in Figs. 1, 2 or 5, or may have any other suitable section by which the friction between the drum and the cable is increased, as and for the purpose specified.

Referring now to Fig. 5, $n$ is a layer of metal, lacquer, paint or other suitable and preferably plastic material on the sheave or drum $a$ by which the friction between the drum or sheave and the cable is increased. $n$ might also be a friction-increasing insertion in the groove $g$. Instead of providing means such as $n$, the drum, or its barrel, might be made of a material possessing the required properties with respect to friction, as described.

Referring now to Fig. 4, the member $o$ is a friction-exerting means of any suitable kind, for instance a brake block, $p$ is a member for exerting pressure on the block $o$ in radial direction, and $q$ is a spring inserted between $o$ and $p$. Now, let R be the friction force between the cable $b$ and the sides of the groove $g$; P the force by which the brake block $o$ is applied to the cable $b$ by the spring $q$; K the reaction forces at the sides of the cable; $u$ the friction coefficient between the cable and the material of, or layer on, the sheave or drum; $t$ the angle included by the sides of the groove $g$; and $x$ a coefficient which is less than 1 and is determined by the form of the groove $g$, being equal to $$\sin \frac{t}{2}$$

for the groove illustrated in Fig. 4; then:

$$R = u \frac{P}{x}.$$

By suitably selecting the section of the groove $g$, the value of $x$ may be so determined that $$\frac{P}{x}$$

is a multiple of P. If $x$ is determined by the section of the groove $g$, the geometrical sum of the reaction forces K is equal to P and their arithmetical sum is equal to $$\frac{P}{x},$$

or $$\frac{P}{\sin \frac{t}{2}}.$$

The same result may be obtained by suitably selecting the friction coefficient $u$ by the means illustrated in Fig. 5, so that the friction coefficient of the plastic layer, paint or insertion $n$ with respect to the cable is higher than the friction coefficient of the brake block $o$ with respect to the cable.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. A hauling machine comprising a rotary member for winding and unwinding a tension member, and means for exerting pressure on said tension member so as to apply it to said winding member, and a layer of a material on said winding member by which the friction between said winding and said tension member is made higher than the friction between said tension member and said pressure-exerting means.

2. A hauling machine comprising a rotary member for winding and unwinding a tension member, and means for exerting pressure on said tension member so as to apply it to said winding member, and a layer of a plastic material on said winding member by which the friction between said winding and said tension member is made higher than the friction between said tension member and said pressure-exerting means.

3. A hauling machine comprising a rotary member for winding and unwinding a tension member, a brake band held against rotation about, and adapted to move in parallel to the axis of said rotary member, for exerting pressure on said tension member so as to apply it to said winding member, the friction between said winding and said tension member being higher than the friction between said tension member and said brake band, and means for exerting tension on said brake band, said tensioning means being so arranged with respect to the direction in which said cable is wound that the forces exerted on said brake band by the cable being wound and by said tensioning means, act in the same direction.

4. A hauling machine comprising a rotary member for winding and unwinding a tension member, a brake band held against rotation about, and adapted to move in parallel to the axis of said rotary member, for exerting pressure on said tension member so as to apply it to said winding member, the friction between said winding and said tension member being higher than the friction between said tension member and said brake band, and a spring for exerting tension on said brake band, said spring being so arranged with respect to the direction in which said cable is wound that the forces exerted on said brake band by the cable being wound and by said spring, act in the same direction.

5. A hauling machine comprising a hauling drum having a helical groove for the reception of the cable to be wound on the drum, the section of said groove being so designed that the inner side of the cable in the groove is spaced from the bottom of the groove, and means fixed against tangential displacement with respect to said drum for exerting pressure on said cable so as to hold the cable in said groove, the friction of said cable in said groove being higher than the friction between said cable and said pressure-exerting means.

6. A hauling machine comprising a hauling drum having a helical groove of trapeze section for the reception of the cable to be wound on the drum, and means fixed against tangential displacement with respect to said drum for exerting pressure on said cable so as to apply the cable to the sides of said groove, the friction of said cable in said groove being higher than the friction between said cable and said pressure-exerting means.

7. A hauling machine comprising a hauling drum having a helical groove whose section presents curved seats arranged at opposite sides of the groove and spaced from its bottom, for the cable to be wound on the drum to bear on, and means fixed against tangential displacement with respect to said drum for exerting pressure on said cable so as to apply the cable to said seats, the friction of said cable on said seats being higher than the friction between said cable and said pressure-exerting means.

HERMANN DONANDT.